United States Patent
Yacoub et al.

(10) Patent No.: US 8,189,762 B2
(45) Date of Patent: May 29, 2012

(54) SYSTEM AND METHOD FOR INTERACTIVE VOICE RESPONSE ENHANCED OUT-CALLING

(75) Inventors: Sherif Yacoub, Mountain View, CA (US); Francois Vincent, Corenc (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 2618 days.

(21) Appl. No.: 10/696,839

(22) Filed: Oct. 30, 2003

(65) Prior Publication Data
US 2005/0096912 A1    May 5, 2005

(51) Int. Cl.
*H04M 3/00*    (2006.01)
(52) U.S. Cl. ............. 379/266.07; 379/88.01; 379/88.13; 379/88.17; 379/88.18
(58) Field of Classification Search ............ 379/69, 379/88.17, 265.01–266.1, 88.01–88.04, 88.13, 379/88.18, 114.01, 266.07; 455/456.1
See application file for complete search history.

(56) References Cited

U.S. PATENT DOCUMENTS

| | | | |
|---|---|---|---|
| 4,941,168 A | 7/1990 | Kelly, Jr. | |
| 5,371,787 A | 12/1994 | Hamilton | |
| 5,404,400 A | 4/1995 | Hamilton | |
| 5,533,118 A | 7/1996 | Cesaro et al. | |
| 5,581,602 A | 12/1996 | Szlam et al. | |
| 5,724,420 A | 3/1998 | Torgrim | |
| 5,774,525 A * | 6/1998 | Kanevsky et al. | 379/88.02 |
| 6,208,970 B1 | 3/2001 | Ramanan | |
| 6,470,077 B1 | 10/2002 | Chan | |
| 6,771,746 B2 * | 8/2004 | Shambaugh et al. | 379/88.13 |
| 6,850,766 B2 * | 2/2005 | Lau et al. | 455/456.1 |
| 6,990,179 B2 * | 1/2006 | Merrow et al. | 379/69 |
| 7,280,651 B2 * | 10/2007 | Anderson | 379/266.07 |
| 7,366,285 B2 * | 4/2008 | Parolkar et al. | 379/88.17 |
| 2002/0160772 A1 | 10/2002 | Gailey et al. | |

\* cited by examiner

*Primary Examiner* — Md S Elahee

(57) ABSTRACT

A system and method for managing telephone calls is disclosed. The method discloses: calling a contact; presenting the contact with a predetermined out-calling dialog; translating the contact's vocal responses to the dialog into textual words using selected interactive voice response algorithms; connecting the contact to a human operator after a predetermined portion of the out-calling dialog with the contact is completed; and providing the operator with the textual words. In one embodiment, the system discloses all means for implementing the method. In another embodiment, the system discloses: a contact database for storing information on the contact; a dialog database containing a predetermined out-calling dialog; a call manager for calling the contact and presenting the contact with the dialog; and an interactive voice response module for translating the contact's vocal responses to the dialog into textual words and storing the words in the contact database which are accessible to the operator.

19 Claims, 3 Drawing Sheets

SYSTEM AND METHOD FOR INTERACTIVE VOICE RESPONSE ENHANCED OUT-CALLING

BACKGROUND OF THE INVENTION

1. Field of the Invention

The present invention relates generally to systems and methods for managing phone calls, and more particularly to interactive voice response enhanced out-calling.

2. Discussion of Background Art

Call centers are increasingly used to process incoming calls from a variety of sources. These sources include, existing customers, potential customers, suppliers, vendors, and many others. Such systems often use Interactive Voice Response (IVR) software as a first step in processing an incoming call before connecting the caller with a human operator. The IVR software improves the call center's efficiency and reduces a number of human operators required to handle the incoming calls by gathering a set of standardized information from the caller which can then be immediately presented to the operator upon connection to the caller.

However, such efficient software support is not available for aiding a call center's outgoing calls. Call centers have a need to place such outgoing calls for a variety of reasons, including conducting market intelligence, customer surveys, quality audits, and telemarketing activities. Operators currently spend a significant amount of time placing calls that are not only answered by fax machines, answering machines, and data ports many times, but are also often answered by individuals who have no interest in the subject matter of the call. As a result a significant amount of operator time is wasted.

Should an individual interested in the call's subject matter be found, such people are often handled by the call center in a very unprofessional way. For example, a called party is often asked the same set of questions several times during the call as the party is passed to different portions of the call center's out-calling system. This is because the party's information is lost during each transition.

Another problem with current automated out-calling systems is that they often place a called party on hold as the system attempts to route the called party to a human operator, who may or may not be available for several minutes. Such limitations in current call center out-calling systems often so frustrate even interested called parties that they hang up after a short time, resulting in another lost chance to achieve the call center's objectives.

In response to the concerns discussed above, what is needed is a system and method for automated out-calling that overcomes the problems of the prior art.

SUMMARY OF THE INVENTION

The present invention is a system and method for managing telephone calls. The method of the present invention includes: calling a contact; presenting the contact with a predetermined out-calling dialog; translating the contact's vocal responses to the dialog into textual words using selected interactive voice response algorithms; connecting the contact to a human operator after a predetermined portion of the out-calling dialog with the contact is completed; and providing the operator with the textual words.

In one embodiment, the system of the present invention includes all means for implementing the method. In another embodiment, the system includes: a contact database for storing information on the contact; a dialog database containing a predetermined out-calling dialog; a call manager for calling the contact and presenting the contact with the dialog; and an interactive voice response module for translating the contact's vocal responses to the dialog into textual words and storing the words in the contact database which are accessible to the operator.

These and other aspects of the invention will be recognized by those skilled in the art upon review of the detailed description, drawings, and claims set forth below.

DETAILED DESCRIPTION OF THE PREFERRED EMBODIMENT

The present invention is an out-calling system 102 for capturing and pre-processing responses from a called party (a.k.a. a contact) within a call center, using automated voice processing techniques, such as Interactive Voice Response (IVR) algorithms. The out-calling system 102 improves call center efficiency by pre-screening the contact's interest before the contact is connected to a human operator. The out-calling system 102 captures and translates the contact's utterances into textual form, enabling the operator to interact with the contact in a more natural way right from the start, such as by not having to ask the contact for information a second time, which the contact has already provided to the computer's IVR system. The out-calling system 102 also keeps the contact engaged, while the contact is waiting for a next available human operator, by automatically providing the contact with further information to the contact. Applications of the out-calling system 102 include soliciting customer feedback, quality assurance, identifying new customers, and computer enhanced telemarketing.

Figure 1:
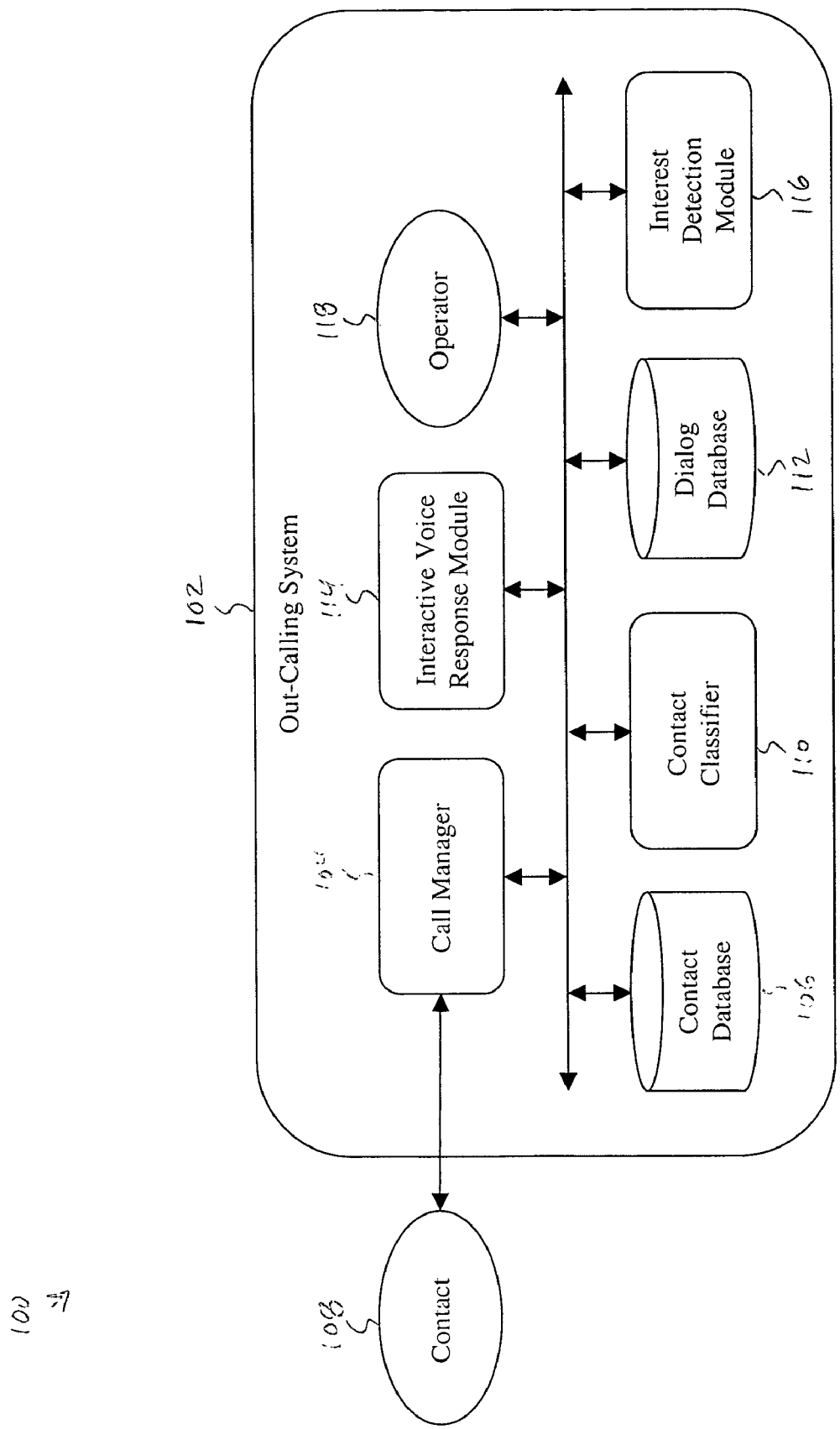
FIG. 1 is a dataflow diagram of one embodiment of a system for automated out-calling.

FIG. 1 is a dataflow diagram of one embodiment of a system 100 for IVR enhanced out-calling. A call manager 104 within the out-calling system 102, accesses a contact database 106 and selects a contact 108 from a set of contacts to be called. The contact database 106 includes a set of attributes associated with each of the contacts. Such attributes include: a phone number, an address, a relationship status (such as whether the contact is a customer and etc.), when the contact was last called by the out-calling system 102, the contact's response to the call, whether the contact should be called again, and many other attributes known to those skilled in the art. These attributes may be populated and supplemented from a variety of sources, including phone directories, the internet, and customer warranty cards. For example, if the purpose of the call center is to perform quality assurance on a particular product, then only those contacts in the contact database 106 that have purchased the product, as indicated by the contact's attributes, are called.

The call manager 104 activates support modules (not shown) within the out-calling system 102 which automatically dial the contact's 108 phone number. The support modules include dialing modules and call processing units, which interface with a telephone network, dial the contact's 108 phone number, detect busy signals, and reschedule the call if a busy signal is detected.

Upon detecting that the contact 108 has answered, a contact classifier 110 classifies the contact 108 as either a person or a non-person. Non-persons include answering machines, fax machines, data ports, and so on. The contact classifier 110 includes various well known algorithms for actually making such classifications.

If the contact 108 is not a person, the call manager 104 terminates the call, and a next contact from the contact database 106 is called in a manner similar to that already discussed with respect to the contact 108.

If a person is detected, the call manager 104 retrieves a predetermined dialog from a dialog database 112. The dialog actually retrieved depends upon the call center's purpose and the attributes of the contact 108. Thus, if the call center's purpose was to perform quality assurance, then the contact 108 will be presented with a dialog that asks a series of quality assurance questions. Dialogs stored in the dialog database can cover a variety of topics, including quality assurance, surveying, and telemarketing.

An Interactive Voice Response (IVR) module 114 translates the predetermined dialog into a form which the contact 108 can understand. For instance, if the contact 108 is not hearing impaired, the IVR module 114 might employ a Text-To-Speech (TTS) translator or a Natural Language Processing (NLP) algorithm. The IVR module 114 captures and interprets the contact's 108 responses to the dialog. The contact's 108 responses may include vocal utterances, telephone tones, or other communication techniques. The IVR module 114 may employ Automated Speech Recognition (ASR) or dialog interpretation (e.g. a Voice-XML interpreter) algorithms for interpreting the contact's 108 responses. The IVR module 114 stores both the contact's 108 responses and interpreted responses in the contact database 106.

Preferably operating in parallel with the IVR module 114 is an interest detection module 116. The interest detection module 116 determines whether the contact 108 is interested in the subject matter of the out-calling system's 102 call.

The detection module 116 applies a set of heuristics to the translated words individually and in their sentence context. The heuristics contain a set of predetermined keywords and keyword synonyms indicating the contact's 108 interested and disinterest.

For instance, the following heuristics indicate that the contact 108 is not interested in continuing the call:

Heuristic 1: If the contact's 108 translated utterances contain the word "sorry," then the contact 108 is not interested. For example, the contact 108 may say, "I am sorry, I am not willing to participate."

Heuristic 2: If the contact's 108 translated utterances contain the word "not" followed by "interest" in the same sentence, then the contact 108 is not interested. For example, the contact 108 says, "I am not interested. Thanks!"

Heuristics 3: If the contact's 108 translated utterances contain the words "call" and "again" or "later" in the same sentence, then the contact 108 is not interested. For example, the contact 108 says, "Please call again later I do not have the time right now."

These heuristics are not necessarily appropriate to each call center dialog, and an exact set of heuristics will need to be empirically determined.

The detection module 116 also keeps a record of translated utterances which can not be matched with any of the predetermined keywords or keyword synonyms.

The interest detection module 116 aggregates the heuristic indicators to conclude whether the contact 108 is interested or not interested in the subject matter of the call. The interest detection module 116 aggregates the heuristics using either a weighting or scoring algorithm. One example of a weighing algorithm is that if the translated words are matched up to a greater number of heuristics indicating "interest" than are matched up to heuristics indicated "not interested", then the contact 108 assigned to the "interested" category. Alternatively, the heuristics can be used to generate confidence scores which are constantly updated as the dialog progresses. A zero confidence score can mean that the contact 108 is definitely not interested and a 100 confidence score can mean that the contact 108 is definitely interested. Threshold weights or scores for concluding that the contact 108 is either interested or not interested can be varied depending upon the particular dialog presented to the contact 108, the contact's attributes, and the call center's purpose.

The contact's 108 interest or lack thereof is recorded in the contact database 106 for later system 102 use when determining which contacts should be called on which dialog subjects.

If the interest detection module 116 determines that the contact 108 is interested, the call manager 104 connects the contact 108 to an operator 118, or queues the contact 108 up for a next available operator. If the operator 118 is not yet available and the contact 108 is in the queue, the call manager 104 either commands the IVR module 114 to continue the dialog, or selects another dialog from the dialog database 112 for the IVR module 114 to enter into with the contact 108. In this way, the contact 108 need not know that they are being placed on hold while waiting in the queue. The out-calling system 102 also preferably includes a "barge-in" routine, whereby the contact 108 can interrupt the dialog with the IVR module 114 at any time and be connected to the operator 118.

If, however, the interest detection module 116 determines that the contact 108 is not interested or if the contact 108 has hung up the phone, the call manager 104 terminates the call with the contact 108.

The following is one of many possible out-calling system 102 dialogs which may be presented to the contact 108. The dialog can start with a greeting and a probing question to see whether the called party is still online, such as, "Hello. This Roby from the Sphinx bank. How are you doing today sir?" The contact 108 might say something here or hang up on the call. If the contact 108 hangs up, the call is terminated and another contact is called. If the contact 108 is still on the line, the out-calling system can say, "The reason I am calling today is to follow up with you regarding the product you purchased from us. We would like to get your feedback on the product. Are you willing to stay on the line with us for 3 to 5 minutes to provide feedback?" The contact 108 may express interest or not. If no interest is detected then a "thank you" message is played for the contact 108 wherein the contact may be asked if the out-calling system 102 can call later and at what time. If the contact 108 expresses interest, then the system 102 keeps the contact 108 engaged in the conversation while the call is being handed over to the operator 118, by saying, "Thank you sir. We would like to explain the process to you while a qualified operator is being selected to conduct the survey with you. We usually conduct this feedback to . . . ."

As mentioned above, the interest detection module 116 preferably is analyzing the contact's 108 responses in parallel with the IVR module's 114 dialog with the contact 108. In this way the contact 108 can be connected with the operator 118 as soon as possible once the interest detection module 116 heuristics indicate that the contact 108 is likely to be interested, or the call can be terminated as soon as the heuristics quite clearly indicate that the contact 108 is not interested. In an alternate embodiment, however, the interest detection module 116 may be programmed to wait until the IVR module's 114 dialog with the contact 108 reaches certain break-points before the interest detection module's 116 heuristics are applied to the contact's 108 responses.

The operator 118, upon being connected to the contact 108, retrieves from the contact database 106 all of the contact's 108 responses to the dialog with the IVR module 114. These responses may either be in textual form or voice utterances. All of the contact's 108 attributes are also available to the operator 118 to aid in direct communication with the contact 108. In this way, the contact's 108 earlier responses are not lost during the handover between the IVR module 114 dialog and the operator 118.

Figure 2:
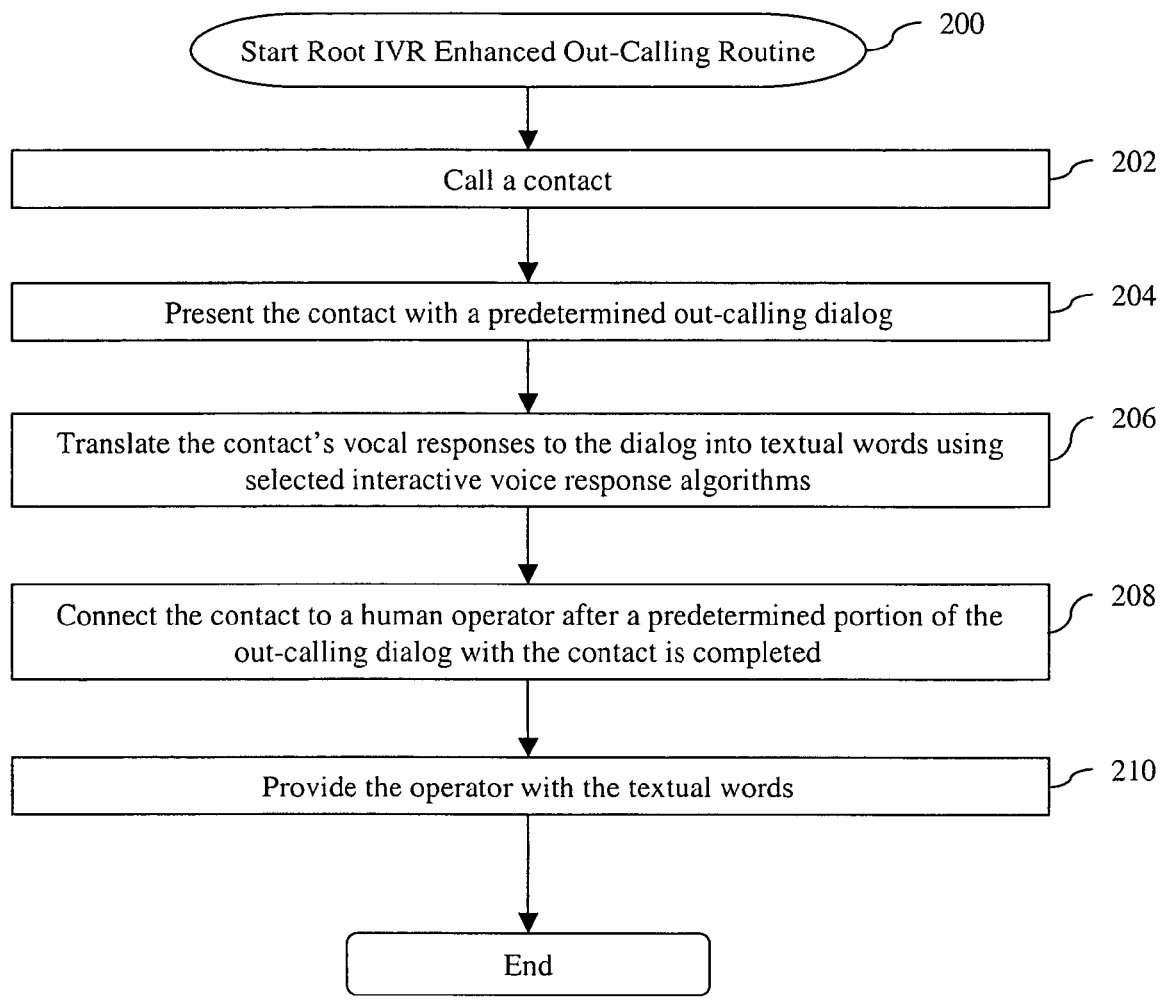
FIG. 2 is a flowchart of one embodiment of a root method for automated out-calling.

FIG. 2 is a flowchart of one embodiment of a root method 200 for IVR enhanced out-calling. The method 200 begins in step 202, by calling a contact. Next, in step 204, the contact is presented with a predetermined out-calling dialog. In step 206, the contact's vocal responses to the dialog are translated into textual words using selected interactive voice response algorithms. In step 208, the contact is connected to a human operator after a predetermined portion of the out-calling dialog with the contact is completed. Then, in step 210, the operator is provided with the textual words translated from the contact's responses. The root method 200 is discussed in further detail with respect to the next Figure.

Figure 3:
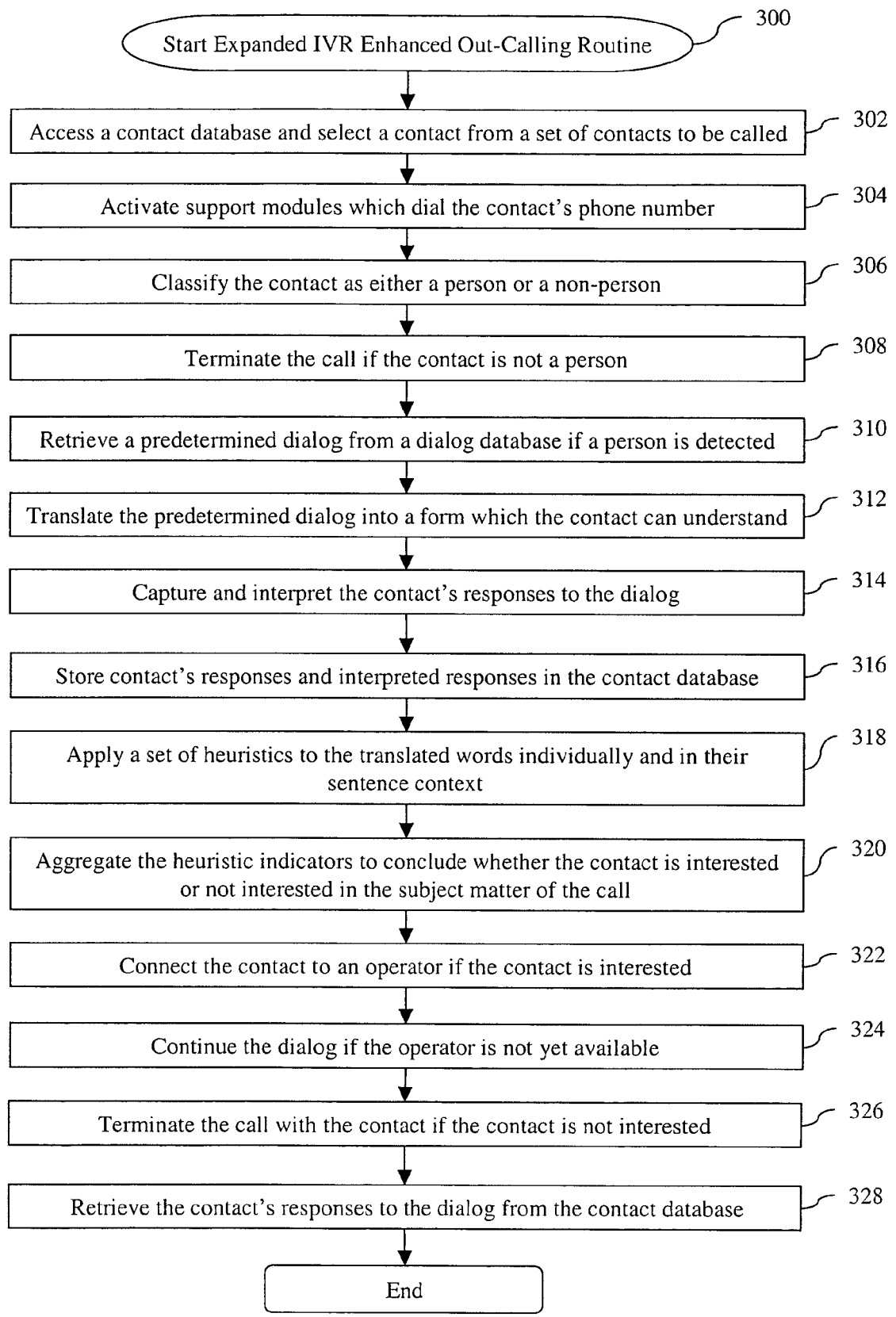
FIG. 3 is a flowchart of one expanded embodiment of the root method for automated out-calling.

FIG. 3 is a flowchart of one expanded embodiment 300 of the root method for IVR enhanced out-calling. To begin, in step 302, a call manager 104 within the out-calling system 102, accesses a contact database 106 and selects a contact 108 from a set of contacts to be called. Next, in step 304, the call manager 104 activates support modules (not shown) within the out-calling system 102 which automatically dial the contact's 108 phone number. In step 306, upon detecting that the contact 108 has answered, a contact classifier 110 classifies the contact 108 as either a person or a non-person. In step 308, if the contact 108 is not a person, the call manager 104 terminates the call, and a next contact from the contact database 106 is called in a manner similar to that already discussed with respect to the contact 108.

In step 310, if a person is detected, the call manager 104 retrieves a predetermined dialog from a dialog database 112. In step 312, an Interactive Voice Response (IVR) module 114 translates the predetermined dialog into a form which the contact 108 can understand. Next in step 314, IVR module 114 captures and interprets the contact's 108 responses to the dialog. In step 316, the IVR module 114 stores both the contact's 108 responses and interpreted responses in the contact database 106.

Preferably operating in parallel with the IVR module 114 is an interest detection module 116. In step 318, the interest detection module 116 applies a set of heuristics to the translated words individually and in their sentence context. The detection module 116 also keeps a record of translated utterances which can not be matched with any of the predetermined keywords or keyword synonyms.

In step 320, the interest detection module 116 aggregates the heuristic indicators to conclude whether the contact 108 is interested or not interested in the subject matter of the call. The interest detection module 116 aggregates the heuristics using either a weighting or scoring algorithm. The contact's 108 interest or lack thereof is recorded in the contact database 106 for later system 102 use when determining which contacts should be call on which dialog subjects.

In step 322, if the interest detection module 116 determines that the contact 108 is interested, the call manager 104 connects the contact 108 to an operator 118, or queues the contact 108 up for a next available operator. In step 324, if the operator 118 is not yet available and the contact 108 is in the queue, the call manager 104 either commands the IVR module 114 to continue the dialog, or selects another dialog from the dialog database 112 for the IVR module 114 to enter into with the contact 108. In step 326, if, however, the interest detection module 116 determines that the contact 108 is not interested or if the contact 108 has hung up the phone, the call manager 104 terminates the call with the contact 108. The contact 108 is connected with the operator 118 as soon as possible once the interest detection module 116 heuristics indicate that the contact 108 is likely to be interested, or the call is terminated as soon as the heuristics quite clearly indicate that the contact 108 is not interested.

In step 328, the operator 118, upon being connected to the contact 108, retrieves from the contact database 106 all of the contact's 108 responses to the dialog with the IVR module 114. In this way, the contact's 108 earlier responses are not lost during the handover between the IVR module 114 dialog and the operator 118.

While one or more embodiments of the present invention have been described, those skilled in the art will recognize that various modifications may be made. Variations upon and modifications to these embodiments are provided by the present invention, which is limited only by the following claims.

What is claimed is:

1. A method for managing telephoning, comprising:
   calling a contact;
   presenting the contact with a predetermined out-calling dialog;
   translating the contact's vocal responses to the dialog into textual words using a voice response algorithm;
   determining whether the contact is interested in the out-calling dialog,
   wherein the determining includes
      applying a set of heuristics to the textual words,
      associating a score with each heuristic,
      totaling the scores, and
      concluding that the contact is interested if the total score is above a predetermined threshold;
   connecting the contact to a human operator after a predetermined portion of the out-calling dialog with the contact is completed if the contact is interested; and
   providing the operator with the textual words.

2. The method of claim 1 wherein the calling includes:
   selecting the contact from a set of contacts within a contact database.

3. The method of claim 1 further comprising:
   classifying the contact as either a person or not a person; and
   terminating the call, if the contact is not a person.

4. The method of claim 1 wherein the presenting includes:
   selecting the dialog from a set of dialogs stored in a dialog database based upon a set of attributes associated with the contact.

5. The method of claim 1:
   further comprising,
      storing the contact's vocal responses, textual words, and contact attributes in a contact database; and
   wherein the providing includes,
      providing the operator with access to the contact database.

6. The method of claim 1 wherein the connecting includes:
   continuing a next portion of the out-calling dialog with the contact while waiting for the human operator to become available.

7. The method of claim 1, wherein the determining includes:
   matching the textual words with predetermined keywords associated with interest.

8. The method of claim 1, wherein the determining includes:
  matching the textual words with predetermined keywords associated with disinterest.

9. The method of claim 1, further comprising:
  terminating the call with the contact, if the contact is not interested.

10. The method of claim 1, further comprising:
  performing the translating and determining elements in parallel.

11. The method of claim 1, further comprising:
  performing the determining element after the predetermined portion of the out-calling dialog with the contact is completed.

12. A method for managing telephone calls, comprising:
  calling a contact;
  presenting the contact with a predetermined out-calling dialog;
  translating the contact's vocal responses to the dialog into textual words using a voice response algorithm;
  determining whether the contact is interested in the out-calling dialog, wherein the determining includes
    applying a set of heuristics to the textual words,
    associating a score with each heuristic,
    totaling the scores, and
    concluding that the contact is interested if the total score is above a predetermined threshold;
  connecting the contact to a human operator after a predetermined portion of the out-calling dialog with the contact is completed if the contact is interested;
  providing the operator with the textual words;
  storing the contact's vocal responses, textual words, and contact attributes in a contact database, wherein the providing includes providing the operator with access to the contact database; and
  terminating the call with the contact, if the contact is not interested.

13. A non-transitory medium having instructions encoded thereon for enabling a processor to perform the operations of:
  calling a contact;
  presenting the contact with a predetermined out-calling dialog;
  translating the contact's vocal responses to the dialog into textual words using a voice response algorithm;
  determining whether the contact is interested in the out-calling dialog, wherein the determining includes
    applying a set of heuristics to the textual words,
    associating a score with each heuristic,
    totaling the scores, and
    concluding that the contact is interested if the total score is above a predetermined threshold;
  connecting the contact to a human operator after a predetermined portion of the out-calling dialog with the contact is completed, if the contact is interested; and
  providing the operator with the textual words.

14. The medium of claim 13:
  further comprising,
    storing the contact's vocal responses, textual words, and contact attributes in a contact database; and
  wherein the providing includes,
    providing the operator with access to the contact database.

15. The medium of claim 13 wherein the connecting includes:
  continuing a next portion of the out-calling dialog with the contact while waiting for the human operator to become available.

16. A system for managing telephone calls, comprising a:
  means for calling a contact;
  means for presenting the contact with a predetermined out-calling dialog;
  means for translating the contact's vocal responses to the dialog into textual words using a voice response algorithm;
  means for determining whether the contact is interested in the out-calling dialog, wherein the means for determining includes
    means for applying a set of heuristics to the textual words,
    means for associating a score with each heuristic,
    means for totaling the scores, and
    means for concluding that the contact is interested if the total score is above a predetermined threshold;
  means for connecting the contact to a human operator after a predetermined portion of the out-calling dialog with the contact is completed, if the contact is interested; and
  means for providing the operator with the textual words.

17. The system of claim 16, further comprising:
  means for storing the contact's vocal responses, textual words, and contact attributes in a contact database.

18. A system for managing telephone calls between an operator and a contact, comprising:
  a contact database for storing information on the contact;
  a dialog database containing a predetermined out-calling dialog;
  a call manager for calling the contact and presenting the contact with the dialog; and
  an interactive voice response module for translating the contact's vocal responses to the dialog into textual words and storing the words in the contact database which are accessible to the operator and for determining whether the contact is interested in the out-calling dialog, wherein the determining includes applying a set of heuristics to the textual words, associating a score with each heuristic, totaling the scores, and concluding that the contact is interested if the total score is above a predetermined threshold; and
  a call connector for connecting the contact to the operator after a predetermined portion of the out-calling dialog is completed, if the contact is interested.

19. The system of claim 18, wherein the contact database includes:
  a set of attributes associated with the contact.

* * * * *